United States Patent [19]

Millay

[11] Patent Number: 4,692,990
[45] Date of Patent: Sep. 15, 1987

[54] HOLLOW TOOL EXCHANGING MECHANISM FOR A MACHINE TOOL

[75] Inventor: Lawrence I. Millay, Springfield, Vt.

[73] Assignee: Ex-Cell-O Corporation, Troy, Mich.

[21] Appl. No.: 739,741

[22] Filed: May 31, 1985

[51] Int. Cl.[4] .......................................... B23Q 3/157
[52] U.S. Cl. ..................................................... 29/568
[58] Field of Search ................................... 29/568, 264

[56] References Cited

U.S. PATENT DOCUMENTS

| | | | |
|---|---|---|---|
| 2,804,727 | 9/1957 | Schmidt | 29/568 X |
| 3,914,854 | 10/1975 | Tsuchiya | 29/568 |
| 4,161,849 | 7/1979 | Youmard et al. | 414/728 X |
| 4,419,612 | 12/1983 | Reda et al. | 51/165.71 X |

FOREIGN PATENT DOCUMENTS 2525147  12/1975  Fed. Rep. of Germany .

Primary Examiner—Z. R. Bilinsky

[57] ABSTRACT

A machine tool, such as an internal grinding machine, includes a tool quill with a hollow tool having a deformable hub releasably held thereon and a compound slide for moving the tool quill relative to a tool removal arm and a replacement tool storage chute. The tool removal arm includes a tool enter station and tool strip station and is rotatable between the workpart axis and a tool discharge chute. For removal of a worn tool, the arm is rotated to position the tool enter station for insertion of a worn wheel thereon by slide movement toward the arm and then rotated to capture the worn wheel at the tool strip station. The slide is then retracted away from the arm to pull the quill out of the hollow tool, leaving the captured tool on the arm. The arm is rotated to carry the worn tool to the discharge chute for disposal while the slide positions the quill at the tool storage chute. Then, the slide is actuated to insert the quill into the deformable hub or sleeve of a replacement hollow tool in the chute and thereby releasably secure the hollow tool on the quill. The quill with the replacement tool thereon is withdrawn from the chute for machining of workparts.

7 Claims, 6 Drawing Figures

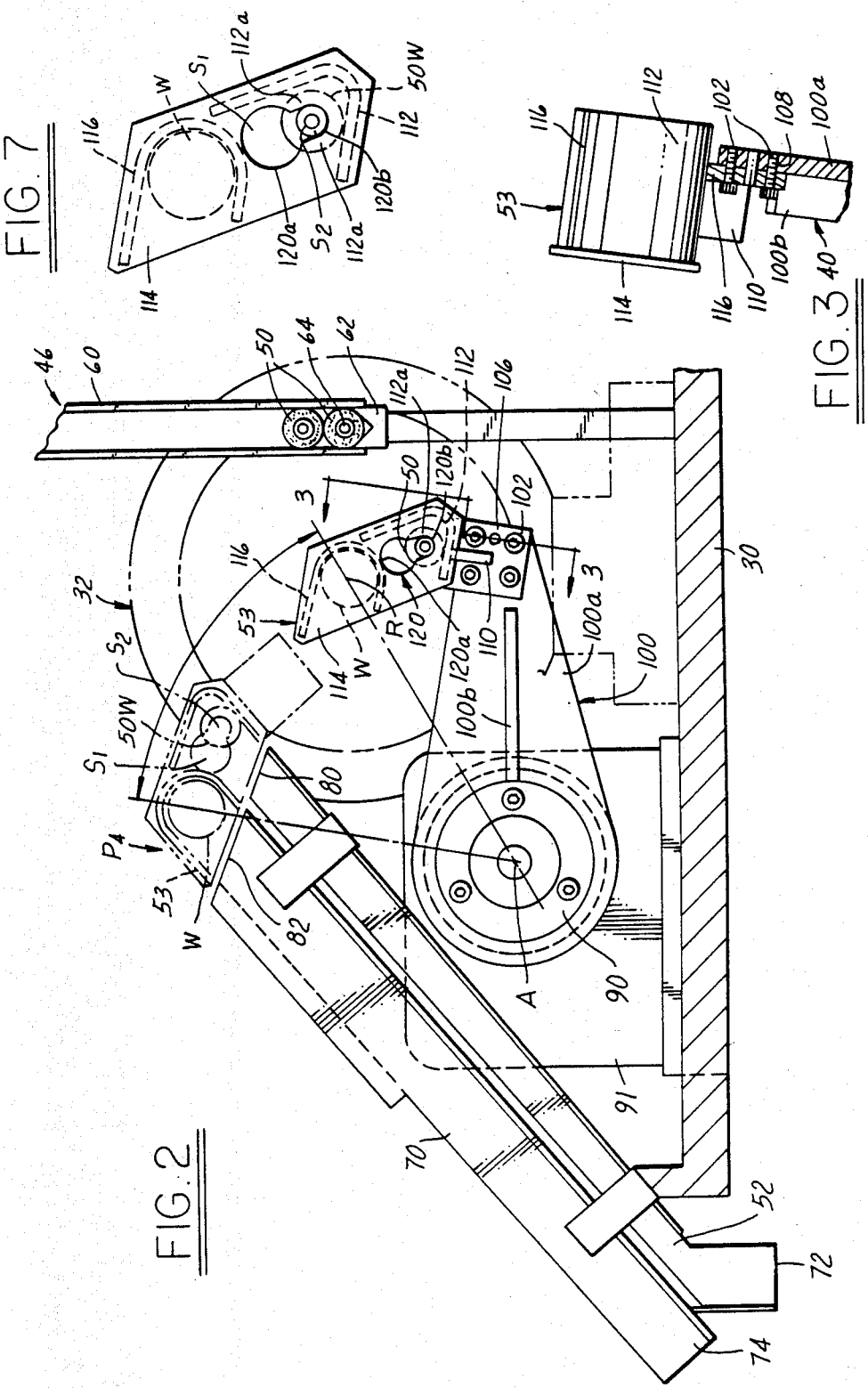

HOLLOW TOOL EXCHANGING MECHANISM FOR A MACHINE TOOL

FIELD OF THE INVENTION

The present invention relates to a tool changer for a machine of the type where a hollow tool with a deformable hub is pushed onto or pulled from a splined quill.

BACKGROUND OF THE INVENTION

A single workhead internal grinding machine with a wheelhead mounted on a compound slide assembly is described in U.S. Pat. No. 4,419,612, issued Dec. 6, 1983, to Kazimierz J. Reda et al. An electro-mechanical control system for controlling all of the movements of the compound slide system is provided and utilizes a control computer interfaced with servo-drive means which, in turn, control slide electric drive motors.

In use, the grinding wheel carried on the wheelhead of such a grinding machine eventually wears to the point where it must be replaced. The grinding wheel can be fixedly mounted on a shaft or quill which is chucked in the wheelhead spindle, e.g. as described in copending U.S. Ser. No. 646,992 filed Sept. 4, 1984 entitled "Tool Quill Exchanging Mechanism For A Machine Tool" in the name of Robert N. Hobbs as inventor, in common assignee herewith, wherein the quill itself is replaced when the wheel thereon is worn. The grinding wheel can also be releasably held on the spindle shaft or quill by using a hollow wheel with a plastic deformable hub and pushing such a wheel on a splined quill to deform and lock the hub between the splines; e.g. as illustrated in German Offenlegungsschrift No. 25 25 147.

There is a need in the art to provide a means for pushing on and pulling off a hollow grinding wheel of the type described in the aforesaid Offenlegungsschrift relative to the quill to reduce non-productive time and labor cost now required for manual wheel replacement.

SUMMARY OF THE INVENTION

The present invention contemplates in a typical working embodiment a grinding machine of the type described having a hollow grinding wheel releasably attached to the spindle quill by a deformable hub and in accordance with the invention further having a replacement wheel storage means, worn wheel discharge means, rotatable wheel removal arm with a worn wheel enter station and worn wheel strip station and slide means for moving the wheel quill between the arm and replacement wheel storage means. For worn wheel removal from the quill in a typical working embodiment, the wheel removal arm is pivoted to position the wheel enter station on the quill centerline and the slide means is actuated toward the arm to move the worn wheel on the quill into the wheel enter station of the arm. The arm is then pivoted relative to the worn wheel on the quill to position the wheel in the wheel strip station with the wheel engageable by a wheel capturing or trapping means at the strip station. The slide means is then actuated to retract the quill away from the strip station while the wheel is trapped therein and thereby pull the quill from out of the wheel hub, leaving the worn wheel at the strip station. The wheel removal arm is then pivoted to place the wheel strip station at the wheel discharge means where the wheel is transferred from the strip station to the discharge means by gravity for example. The slide means is actuated to move the stripped quill to the replacement wheel storage means where the axes of the quill and replacement hollow wheel are coaxially aligned and then to cause the quill to penetrate inside the replacement wheel so as to deform a deformable hub inside the wheel to releasably join the replacement wheel on the quill upon extraction of the quill with a replacement wheel thereon from the wheel storage means.

The pivoting of the wheel removal arm and movement of the slide means are typically controlled by the central programmable control computer of the grinding machine to automatically effect worn wheel removal and replacement wheel pick-up from the wheel storage means when a worn wheel condition is sensed by determining wheel diameter at a wheel dressing location.

BRIEF DESCRIPTION OF THE DRAWINGS

FIG. 2 is an elevation taken in the direction of arrows 2 of FIG. 1 looking in the direction of the workhead.

FIG. 3 is a partial elevation of the wheel removal arm taken in the direction of arrows 3 of FIG. 2.

FIG. 7 is an enlarged elevation of the fixture 53.

DESCRIPTION OF PREFERRED EMBODIMENTS

Figure 1:
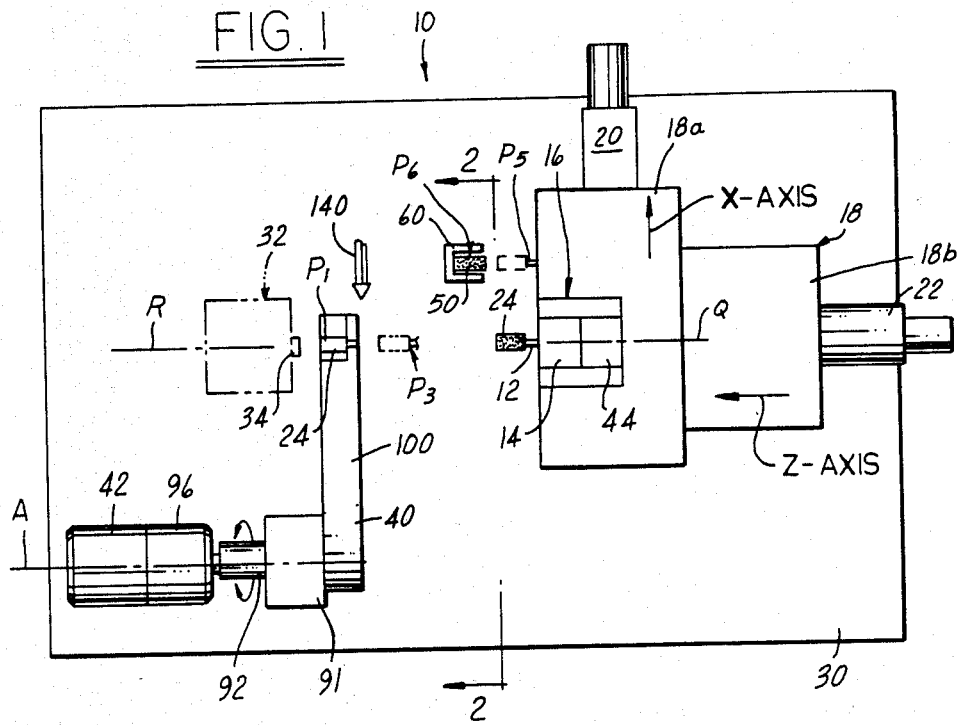
FIG. 1 is a plan view in schematic form of a grinding machine constructed in accordance with the invention.

Referring to FIG. 1, the reference numeral 10 generally designates a one-station electro-mechanical internal grinding machine with a single grinding wheel quill 12 threadably chucked in a rotatable spindle 14 in wheelhead 16 for rotation about axis Q. Wheelhead 16 is carried on a compound slide assembly 18 having a cross or X-axis slide 18a and a longitudinal or Z-axis slide 18b movable along their respective axes by respective servo-motors 20,22. A hollow grinding wheel 24 is releasably held on quill 12 as described hereinbelow.

The grinding machine 10 includes a conventional fixed bed or base member 30 on which is mounted the compound slide assembly 18 as well as a conventional workhead 32. The workhead 32 may be of any suitable conventional structure and includes a chucking fixture 34 for holding a hollow workpiece whose internal cylindrical bore is to be ground while the workpart is rotated about its rotational axis R.

Between the wheelhead 16 and workhead 32 is positioned a workpart unload arm 40 which is pivoted about axis A substantially parallel to rotational axis R (or centerline) of the workpart chuck 34 by motor 42 mounted on base 30.

As mentioned, the wheel quill 12 is operatively chucked in the spindle 14 which is rotated in known fashion by a spindle drive motor 44. The wheelhead 16 can be moved simultaneously in the X-axis and Z-axis directions by slides 18a, 18b, as is well known. By movement of slides 18a, 18b, the grinding wheel 24 on the quill 12 can be moved to and from the workpart held in chucking fixture 34; i.e. into the bore of the workpart in contact with the bore wall to grind same when the arm 40 is pivoted out of the way. The wheel 24 on quill 12 can also be moved by slides 18a, 18b relative to the arm 40 as shown in FIG. 1 and to a replacement wheel storage chute 46 shown in FIG. 2 as and for purposes to be explained hereinbelow.

Figure 6:
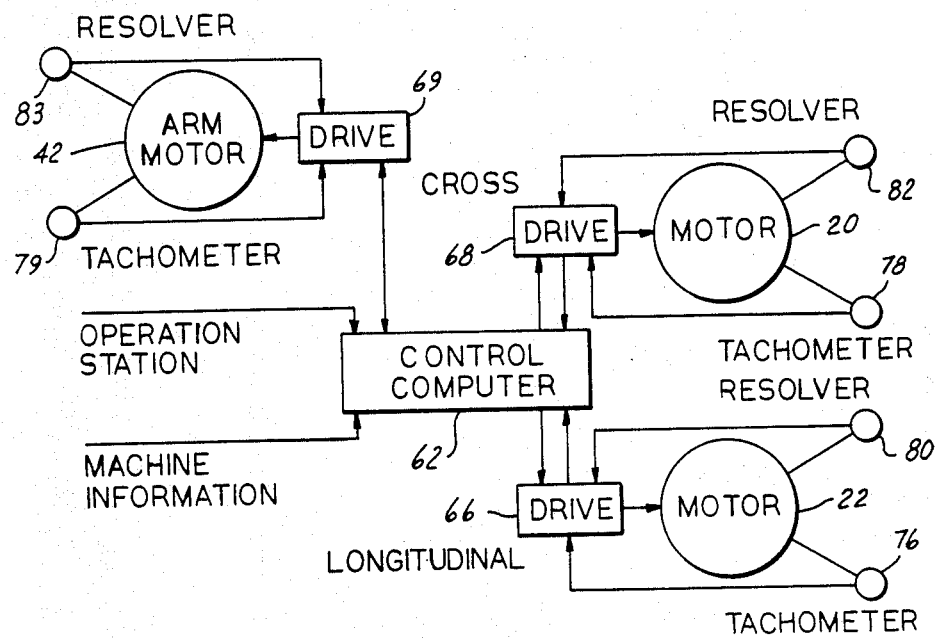
FIG. 6 is a block diagram of the control system for the exemplary grinding machine.

FIG. 6 is a block diagram of the control system employed to control movements of arm 40 and of the X-axis and Z-axis slides 18a and 18b on which the wheelhead 16 is carried. The numeral 62 generally designates a control computer which is programmed to control all machine functions and interlocks. Such functions include lubrication status, safety interlocks, motor status and operation control station information. The control computer 62 may be any suitable digital computer or micro-processor. The control computer 62 has stored the positions and rates for all the axis moves for the various sequences which may include a grind cycle, dress cycle, worn wheel removal and wheel replacement cycle and so forth. The control computer 62 sends servo-drive signals to the servo-drive means 66 and 68 for controlling the servo-motors 20,22 with respect to the respective X-axis and Z-axis slides to cause the grinding wheel to move in the desired path. The servo-drive means 66,68, take feedback from the tachometers 76,78 respectively. The numerals 80,82 designate either resolvers, encoders or "INDUCTOSYN" transducers and they provide feedback signals to the drive means 66,68 respectively, in closed servo-loop manner with the tachometers.

A suitable control computer 62 is available on the market from Intel Corp. of Santa Clara, Calif. 95054 and sold under the name of "INTEL" (a trademark) 86/05 Single Board Computer. The servo-drive means 66,68,69 may be any suitable servo-drive means as, for example, a servo-drive available on the market from Hyper Loop, Inc. of 7459 W. 79 Street, Bridgeview, Ill. 60455 under the trademark "HYAMP". The HYAMP servo-drive is a single phase, full wave, bi-directional SCR servo-drive for D.C. motors and it provides D.C. drive power for precise speed control and regulation over a wide speed range. Another suitable servo-drive designated as Size 50 is available from General Electric Co., 685 West Rio Road, Charlottsville, Va. 22906.

The servo-motors 20,22,42 may be any suitable D.C. servo-motor. Suitable D.C. servo-motors of this type are available from Torque Systems Inc., 225 Crescent Street, Waltham, Mass. 02154 under the trademark "SNAPPER" and identified as from sizes 3435 and 5115. A larger motor of this type is also available from the H. K. Porter Co., 301 Porter Street, Pittsburg, Pa. 15219.

The tachometers 76,78,79 are part of the respective D.C servo-motors. The resolvers, encoders or INDUCTOSYN transducer 80,82,83 are commercially available items and may be any suitable conventional position feedback devices available on the market. Resolvers of this type are available from the Clifton Precision Company of Clifton Heights, Pa. 19018. INDUCTOSYN precision linear and rotary position transducers are available from Farrand Controls, a division of Farrand Industries, Inc., 99 Wall Street, Valhalla, N.Y. 10595. A suitable optical shaft angle encoder designated as Model No. DRC-35 is available from Dynamics Research Corp., 60 Concord Street, Wilmington Mass. 01887.

The X-axis and Z-axis slides 18a,18b are driven and controlled by the control system described above by a conventional ball screw (not shown), Acme screw or other screw means rotated by servo-motors 20,22 as explained in U.S. Pat. No. 4,419,612 issued Dec. 6, 1983 of common assignee, the teachings of which are incorporated herein by reference.

The operation of such a grinding machine 10 in the grinding mode under control of a control computer is described in detail in the aforementioned U.S. Pat. No. 4,419,612 incorporated herein by reference hereinabove.

In accordance with the present invention, the grinding machine 10 further includes the replacement wheel storage chute 46 in which one or multiple hollow replacement grinding wheels 50 are stored for future use, the worn wheel discharge chute 52 into which a worn wheel is deposited as hereafter described and the fixture 53 on arm 40 having wheel enter station $S_1$ and wheel strip station $S_2$ as shown best in FIG. 7.

In particular, the replacement wheel storage chute 46 comprises a generally vertical U-shaped channel 60 supported in fixed position on base member 30 and having a V-shaped stop 62 at the bottom thereon on which a replacement wheel 50 rests. The replacement grinding wheel 50 is a hollow abrasive cylinder in form with a plastic deformable hub or sleeve 64 in the cylinder bore. The plastic sleeve 64 may be integrally attached to the cylinder or a separate sleeve held by interference in the cylinder bore. A plurality of replacement wheels 50 can be stacked one atop the other in the channel 60. The longitudinal axes of the hollow cylidrical replacement tools in chute 46 are generally parallel to rotational axes Q, R and A.

The worn wheel discharge chute 52 is fixedly supported on base 30 by suitable supports and is disposed on the side of arm 40 opposite from replacement wheel chute 46 and adjacent a workpart discharge chute 70. The wheel discharge chute 52 terminates in a lower open end 72 through which worn wheels can fall by gravity into a bin or receptacle (not shown). Similary, workpart discharge chute 70 terminates in a lower open end 74 through which ground workparts can fall by gravity into another bin or receptacle (not shown). Both chutes 52 and 70 include respective open upper ends 80 and 82 which are adapted to receive worn wheels 50W and ground workparts W, respectively, from the fixture 53 of arm 40.

The arm 40 is shown in detail in FIGS. 1-3 as including a rotatable cylindrical hub 90 mounted in housing 91 on base 30 with a rear input shaft 92 adapted to be rotated by rotary motor 42 through a conventional gear reducer 96. Arm 40 also includes projecting web 100 having a vertical plate 100a and horizontal reinforcement plate 100b. Attached to the terminus or end of the web 100 by machine screws 102 is fixture 53 having attachment plate 106 with bores adapted to receive screws 102. Screws 102 are also threaded into aligned threaded holes 108 in the web 100. A support member plate 110 extends from the attachment plate 106 toward the wheelhead 16 and is in turn attached to a generally U or V-shaped wheel cradle member 112. The end of wheel cradle member 112 nearest the wheelhead is attached to a front plate 114 such as by welding. A workpart cradle member 116 in turn is attached to the front plate 114. Both the wheel cradle member 112 and workpart cradle member 116 are open on the end facing the workhead. The other end of the workpart cradle member 112 facing the wheelhead is closed off by the front plate 114 as shown best in FIG. 2. The other end of wheel cradle member 112 facing the wheelhead communicates with a keyhole type aperture 120 in the front plate 114. The keyhole aperture includes a large diameter portion 120a having a diameter to receive a worn grinding wheel and a smaller diameter portion 120b adapted to receive the quill 12 but not the worn grinding wheel for purposes explained hereinbelow. Large diameter portion 120a defines a worn wheel enter station $S_1$, whereas smaller portion 120b along with the adjacent flange 112a of the front plate define a worn wheel strip station $S_2$ with the flanges 112a acting to trap or capture the worn wheel in the wheel cradle member when the quill is retracted therefrom as explained hereinbelow. The centers of the larger diameter hole portion 120a and smaller diameter hole portion 120b are disposed on the same circular arc from the pivot or rotational axis A of the arm 40.

In operation to exchange a replacement grinding wheel for a worn grinding wheel releasably held on quill 12, the arm 40 is rotated to position the worn wheel enter station $S_1$ formed by cylindrical aperture 120a coaxially with the rotational axis R or centerline of the workpart. The X-axis slide 18a is then moved by servo-motor 20 to place the quill axis Q coaxially with wheel enter station $S_1$, and the Z-axis slide 18b is then moved by servo-motor 22 to place the worn wheel on quill 12 longitudinally or axially fully past the front plate 114 to the side thereof facing the workhead in a "start strip" position $P_1$ shown in FIG. 1. Arm 40 is rotated counterclockwise relative to quill 12 (FIG. 2) to position the wheel strip station $S_2$ formed by cylindrical aperture 120b coaxially with the rotational axis R with the diameter of aperture 120b being sufficient to receive the quill 12 but being smaller than the diameter of the worn wheel such that adjacent flanges 112a will trap the wheel to prevent its being pulled out of the wheel cradle member 112 in the direction of the wheelhead, thereby retaining the wheel in a "wheel strip" position. Longitudinal slide 18b is now moved by servo-motor 22 longitudinally away from the arm 40 and during such movement the quill 12 is removed from the deformed hub 64 of the hollow grinding wheel. The slide 18b stops at a "wheel is stripped" Position $P_3$ shown in FIG. 1. After the grinding wheel is stripped from the quill, the wheel remains in the wheel cradle member 112. Arm 40 is rotated conunterclockwise to position the fixture 53 in the "discharge" or "unload" position $P_4$ shown in FIG. 2 where the wheel cradle member 112 and workpart cradle member 116 are positioned adjacent the open top ends 80 and 82 of the discharge chutes 52 and 70 with the cradle members opening into the open chute ends so that a worn wheel in cradle member 112 and a ground workpart in cradle member 116 fall by gravity into the respective discharge chutes 70 and 52 for disposal.

Figure 4:
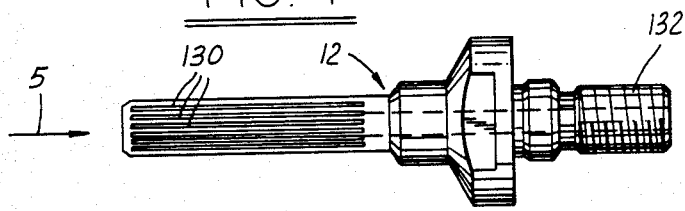
FIG. 4 is a side elevation of a quill useful in the invention.
Figure 5:
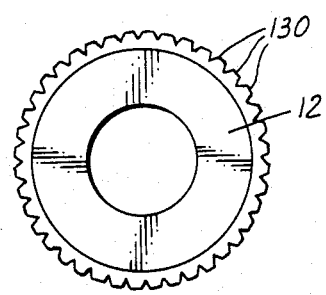
FIG. 5 is an end elevation of the quill of FIG. 4 to show splines thereon.

At the same time as arm 40 moves to the "discharge" position $P_4$, slides 18a and 18b are simultaneously actuated by their respective servo-motors 20,22 to position the quill 12, which is threadably engaged in spindle 14, without a wheel thereon at the "enter wheel chute" position $P_5$ shown in FIG. 1. Arm 40 thereafter remains at position $P_4$ until another workpart is to be discharged or until another worn wheel is to be removed and discharged. The quill 12 is then moved from position $P_5$ on slide 18b into the hub of a replacement wheel in storage chute 46 so that splines 130 (FIGS. 4 and 5) on the quill deform the plastic hub or sleeve of the replacement wheel, releasably securing the wheel onto the quill 12. The "wheel is loaded" position $P_6$ where the replacement wheel has been releasably secured to the quill by the quill being inserted in the wheel in the chute is shown in FIG. 1. Thereafter, slide 18b is moved longitudinally away from the wheel storage chute with the replacement wheel releasably held on the quill and ready for grinding workparts after a dressing operation to true its surface at wheel dresser 140. Of course, slides 18a and 18b move the quill with new wheel thereon to the dresser.

Operation of the slides 18a, 18b and arm 40 to exchange a worn grinding wheel with a replacement grinding wheel as described hereinabove is controlled automatically by the central control computer 62 and results in significant reduction in machine down-time and labor heretofore required for wheel changing.

Although the invention has been described hereinabove with respect to a internal grinding machine, this was merely for illustrative purposes and the invention is applicable to other machine tools using a hollow tool other than a grinding wheel. Further, although certain preferred features and embodiments of the invention have been described hereinabove and illustrated in the Figures, it is to be understood that modifications and changes may be made therein without departing from the spirit and scope of the invention as defined in the appended claims.

I claim:

1. A machine having a rotatable quill, a hollow tool releasably held on the quill, slide means for carrying and positioning the quill, tool storage means for storing at least one hollow replacement tool, tool discharge means for receiving a worn hollow tool stripped from the quill, a tool removal arm means rotatable about a rotational axis between a tool removal position and tool discharge position adjacent the tool discharge means and having a tool enter station into which a worn tool on the quill is initially inserted by movement of the slide means and a tool strip station at which the worn tool is subsequently positioned, said tool enter station and tool strip station being spaced apart on the same circular arc relative to the rotational axis of the tool removal arm means and interconnected so that rotation of said arm means relative to said quill places the worn tool subsequently at said tool strip station, said tool strip station including tool trapping means fixed in position on the arm means for engaging the worn tool at the tool removal position, and means for rotating said arm means between the tool removal position and tool discharge position, the worn tool being stripped from the quill at said tool removal position by said slide means retracting the quill from the tool strip station while the worn tool is held by said tool trapping means and being discharged into said tool discharge means by rotation of said arm carrying the worn tool to said discharge means, said slide means carrying the quill without a hollow tool thereon to said tool storage means for releasably securing the hollow replacement tool on the quill.

2. The machine of claim 1 which further includes a workhead for rotating the workpart on a rotational axis and wherein the rotational axis of the tool removal arm means is substantially parallel to said rotational axis of the workpart.

3. The machine of claim 2 wherein the tool removal arm means is rotatable in a plane substantially transverse to the rotational axis of the workpart and quill.

4. The machine of claim 1 wherein the tool removal arm means includes fixture with a plate member to which a worn wheel cradle member is attached and wherein the plate member includes a keyhole aperture communicating with the cradle member, said aperture having a generally cylindrical portion of selected diameter adapted to receive the worn wheel and forming the tool enter station and a smaller diameter generally cylindrical portion adapted to receive the quill and forming the tool strip station, the centers of the selected diameter portion and smaller diameter portion being on the same circular arc relative to the rotational axis of the arm means.

5. The machine of claim 1 wherein the replacement tool storage means comprises an upright chute for storing a plurality of replacement tools with their longitudinal axes generally parallel to the rotational axis of the arm.

6. The machine of claim 1 wherein the tool removal arm also includes a workpart carrying means to carry a machined workpart and the worn wheel and wherein a workpart discharge means is disposed adjacent the tool discharge means for discharge of a workpart and worn tool at the same time.

7. The machine of claim 2 wherein at the tool exchange the tool enter station is initially substantially coaxially aligned with the workhead rotational axis and then the tool strip station is substantially coaxially aligned with the workhead rotational axis.

* * * * *